United States Patent
Narita

(10) Patent No.: US 10,359,978 B2
(45) Date of Patent: Jul. 23, 2019

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Yuki Narita, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/868,088

(22) Filed: Jan. 11, 2018

(65) Prior Publication Data

US 2018/0203652 A1   Jul. 19, 2018

(30) Foreign Application Priority Data

Jan. 18, 2017   (JP) ................................ 2017-007003

(51) Int. Cl.
| | |
|---|---|
| *G06F 3/12* | (2006.01) |
| *H04N 1/44* | (2006.01) |
| *G06F 21/60* | (2013.01) |
| *G06F 21/31* | (2013.01) |
| *H04N 1/00* | (2006.01) |
| *H04W 48/04* | (2009.01) |

(52) U.S. Cl.
CPC .......... *G06F 3/1236* (2013.01); *G06F 3/1286* (2013.01); *G06F 21/31* (2013.01); *G06F 21/608* (2013.01); *H04N 1/00411* (2013.01); *H04N 1/4433* (2013.01); *G06F 3/1203* (2013.01); *H04N 2201/0048* (2013.01); *H04N 2201/0094* (2013.01); *H04W 48/04* (2013.01)

(58) Field of Classification Search
CPC ...... G06F 3/1236; G06F 21/31; G06F 3/1203; G06F 3/1286; G06F 21/608; H04N 1/00411; H04N 1/4433; H04N 2201/0048; H04N 2201/0094
USPC ........................................................ 455/3.01
See application file for complete search history.

(56) References Cited

U.S. PATENT DOCUMENTS

| | | | | |
|---|---|---|---|---|
| 2012/0127523 | A1* | 5/2012 | Terashita | ............. G06F 3/1203 358/1.15 |
| 2015/0092607 | A1* | 4/2015 | Ando | .................. H04L 41/0893 370/255 |

FOREIGN PATENT DOCUMENTS

| | | |
|---|---|---|
| JP | 2006123239 A | 5/2006 |
| JP | 5054129 B2 | 10/2012 |

* cited by examiner

*Primary Examiner* — Eugene Yun
(74) *Attorney, Agent, or Firm* — Rossi, Kimms & McDowell LLP

(57) ABSTRACT

An MFP (image processing apparatus) activates a specific AP by a software AP mode for using a setting service that allows an external apparatus to perform network setting to cause the MFP to connect to a network by the software AP mode. If the MFP receives, from a mobile terminal via a WLAN I/F, a connection request to the activated specific AP, the MFP executes processing to limit the number of external apparatuses (mobile terminals) that can connect to the specific AP to use a WLAN setting service. The MFP limits, for example, the number of the external apparatuses that can connect to the specific AP to one.

19 Claims, 11 Drawing Sheets

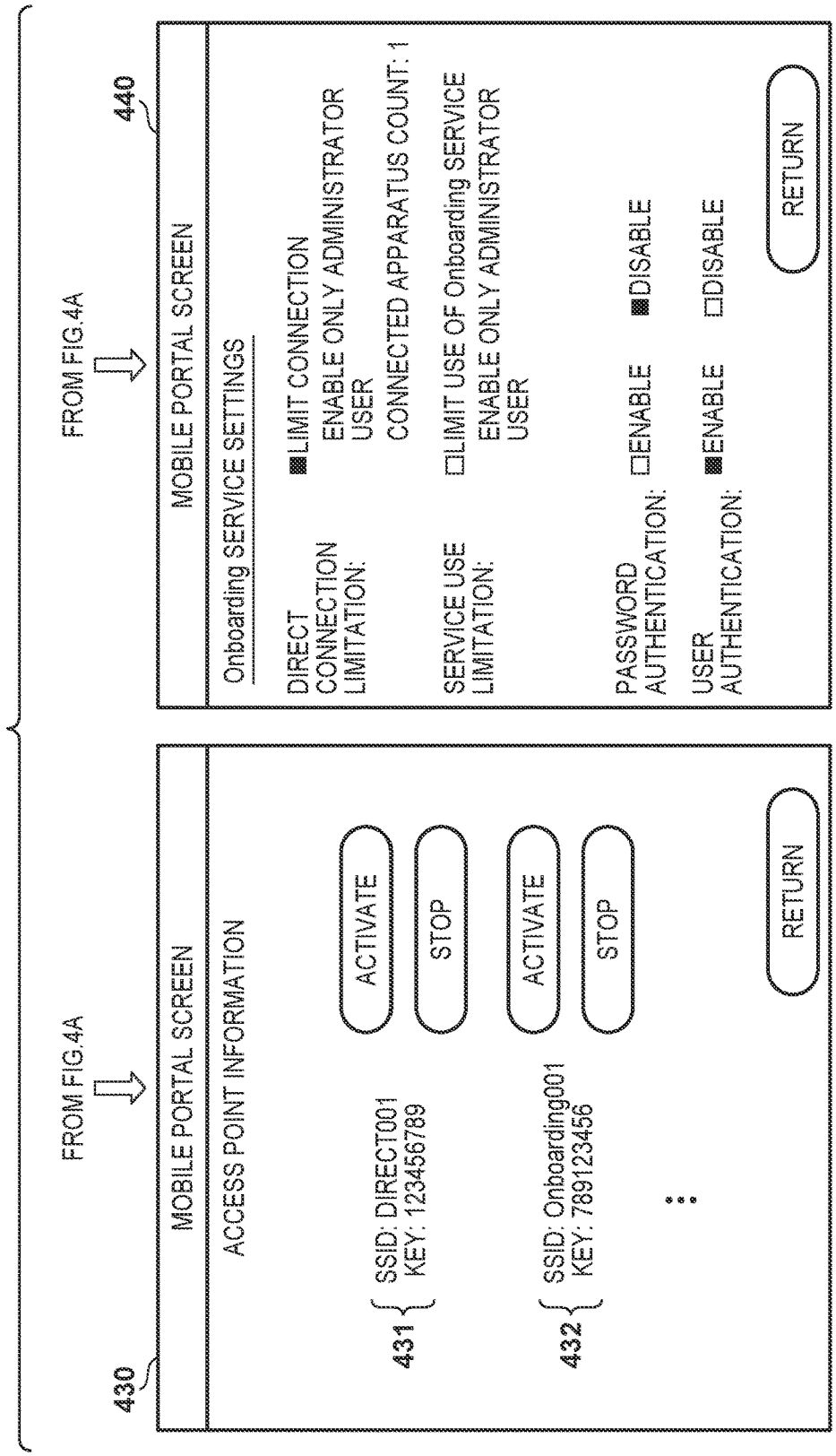

IMAGE PROCESSING APPARATUS, CONTROL METHOD THEREOF, AND STORAGE MEDIUM

BACKGROUND OF THE INVENTION

Field of the Invention

The present invention relates to an image processing apparatus that performs network setting via a mobile terminal, a control method thereof, and a storage medium.

Description of the Related Art

There is known an image processing apparatus, such as a printing apparatus and a multi-function peripheral (MFP), that has a wireless LAN (Local Area Network) access point function and executes a print job received from a wireless terminal by wireless LAN communication (see Japanese Patent Laid-Open No. 2006-123239). A wireless terminal can establish a wireless direct connection to the image processing apparatus when in a case where an access point function is used.

There is also proposed a method of performing, on an image processing apparatus from a mobile terminal such as a notebook PC via a wired interface, setting to cause the image processing apparatus to connect to an external wireless access point (that is, to connect to a network) (see Japanese Patent No. 5054129). In a case in which the image processing apparatus has an access point function, the mobile terminal can establish a wireless direct connection to the image processing apparatus and perform setting to cause the image processing apparatus to connect to an external wireless access point. In this case, the mobile terminal instructs the image processing apparatus about the wireless access point to which it is to be connected, and the image processing apparatus connects to the instructed wireless access point. A service that implements such settings may be referred to as an Onboarding service.

However, in a case where an image processing apparatus that operates as a wireless access point is to permit connections from a plurality of terminals, a conflict may occur between the setting instructions concerning the network to be connected (the wireless access point) which are transmitted from the plurality of terminals to the image processing apparatus. For example, if setting to cause the image processing apparatus to connect to a first network is performed from a mobile terminal of a given user, there is a possibility that setting to cause the image apparatus to connect to a second network may be performed from another mobile terminal at the same timing.

SUMMARY OF THE INVENTION

The present invention has been made in consideration of the above problem. The present invention provides, in an image processing apparatus which has an access point function and whose network setting can be performed from an external apparatus, a technique to prevent a conflict from occurring between setting instructions transmitted from a plurality of external apparatuses to the image processing apparatus.

According to one aspect of the present invention, there is provided an image processing apparatus comprising: a wireless interface configured to operate in a first mode which causes the image processing apparatus to operate as a wireless access point (AP) and in a second mode which causes the image processing apparatus to operate as a wireless terminal; a memory device that stores a set of instructions; and at least one processor that executes the instructions to: activate a specific wireless AP by the first mode for using a setting service that allows an external apparatus to perform setting to cause the image processing apparatus to connect to a network by the second mode; receive, from an external apparatus via the wireless interface, a connection request to the activated specific wireless AP; and execute, in a case where the connection request is received, processing to limit a number of external apparatuses that can connect to the specific wireless AP to use the setting service.

According to another aspect of the present invention, there is provided a control method of an image processing apparatus that includes a wireless interface configured to operate in a first mode which causes the image processing apparatus to operate as a wireless access point (AP) and in a second mode which causes the image processing apparatus to operate as a wireless terminal, the method comprising: activating a specific wireless AP by the first mode for using a setting service that allows an external apparatus to perform setting to cause the image processing apparatus to connect to a network by the second mode; receiving, from an external apparatus via the wireless interface, a connection request to the specific wireless AP activated in the activating; and executing, in a case where the connection request has been received in the receiving, processing to limit a number of external apparatuses that can connect to the specific wireless AP to use the setting service.

According to still another aspect of the present invention, there is provided a non-transitory computer-readable storage medium storing a computer program for causing a computer to execute a control method of an image processing apparatus that includes a wireless interface configured to operate in a first mode which causes the image processing apparatus to operate as a wireless access point (AP) and in a second mode which causes the image processing apparatus to operate as a wireless terminal, the method comprising: activating a specific wireless AP by the first mode for using a setting service that allows an external apparatus to perform setting to cause the image processing apparatus to connect to a network by the second mode; receiving, from an external apparatus via the wireless interface, a connection request to the specific wireless AP activated in the activating; and executing, in a case where the connection request has been received in the receiving, processing to limit a number of external apparatuses that can connect to the specific wireless AP to use the setting service.

According to the present invention, in an image processing apparatus which has an access point function and in which an external apparatus can set the network settings of the image processing apparatus, the occurrence of a conflict between the setting instructions transmitted from a plurality of external apparatuses to the image processing apparatus can be prevented.

Further features of the present invention will become apparent from the following description of exemplary embodiments with reference to the attached drawings.

BRIEF DESCRIPTION OF THE DRAWINGS

FIGS. 4A and 4B show an example of operation screens to be displayed on an operation unit 205 when a mobile portal 304 is used in the MFP 100;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<System Arrangement>

Figure 1:
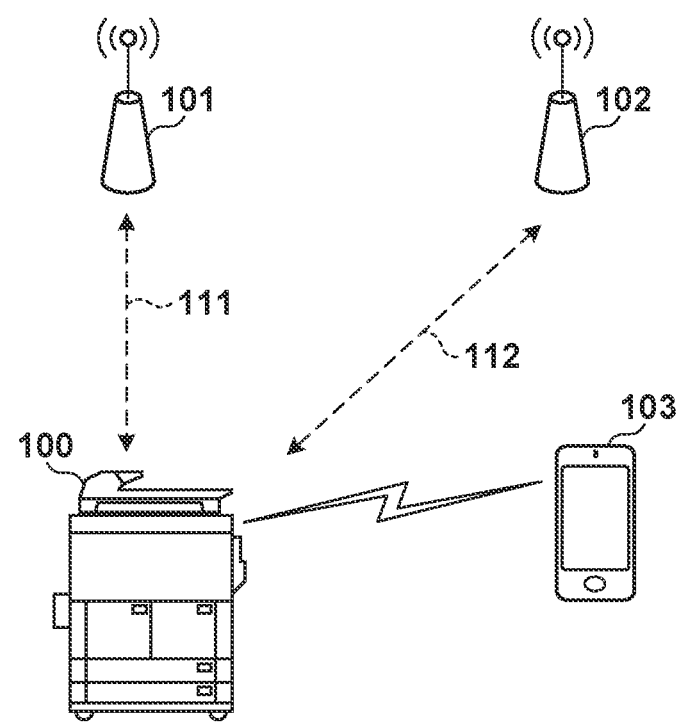
FIG. 1 shows an example of the arrangement of a system.

FIG. 1 shows an example of the arrangement of a system according to the present embodiment. As shown in FIG. 1, the present embodiment will exemplify a system which includes an MFP 100, access points (APs) 101 and 102, and a mobile terminal 103. Note that there may be only one AP or more APs. There may also be more mobile terminals. The mobile terminal 103 is, for example, a smartphone or a tablet terminal. The APs 101 and 102 are wireless APs connected to a network such as a LAN (Local Area Network) or the like.

The MFP 100, the APs 101 and 102, and the mobile terminal 103 all have a wireless communication function (WLAN communication function) by a scheme (WLAN scheme) complying with a wireless LAN (WLAN) standard such as IEEE802.11a/b/g/n. The MFP 100 and the mobile terminal 103 can connect to the AP 101 or 102 by the WLAN scheme to access a network to which the AP 101 or 102 is connected. Although the APs 101 and 102 are assumed to be connected to different networks from each other (LANs 221 and 222, respectively, in FIG. 2), they may be connected to the same network. The MFP 100 and the mobile terminal 103 can establish, as will be described later, a wireless direct connection by the WLAN scheme and directly communicate with each other without intervention of a wireless AP such as the AP 101 or 102. Note that the MFP 100 can establish a wireless direct connection with the mobile terminal 103 in a state of being connected to the AP 101 or 102 (a state of being connected to a network).

The MFP 100 according to the present embodiment is installed with an Onboarding service (WLAN setting service) which serves as a setting service that allows an external apparatus such as the mobile terminal 103 to perform network setting to cause the MFP 100 to connect to a network (wireless AP). The mobile terminal 103 can establish, while the WLAN setting service is operating in the MFP 100, a wireless direct connection to the MFP 100 to use the WLAN setting service of the MFP 100 from the mobile terminal 103.

If the MFP 100 is in a state of not being connected to a network, it is possible to cause the MFP 100 to connect to a network by using the WLAN setting service. For example, the MFP can be connected to the network by causing the MFP 100 to connect to the AP 101 or 102. If the MFP 100 is in a state of being connected to the network, it is possible to change the connection destination network of the MFP 100 by using the WLAN setting service. For example, if the MFP 100 is connected to the AP 101, the connection destination wireless AP can be changed from the AP 101 to the AP 102. Accordingly, the wireless connection of the MFP 100 is switched from a connection 111 to the AP 101 to a connection 112 to the AP 102, thereby changing the connection destination network (changing from the LAN 221 to the LAN 222).

<Hardware Arrangement of MFP 100>

Figure 2:
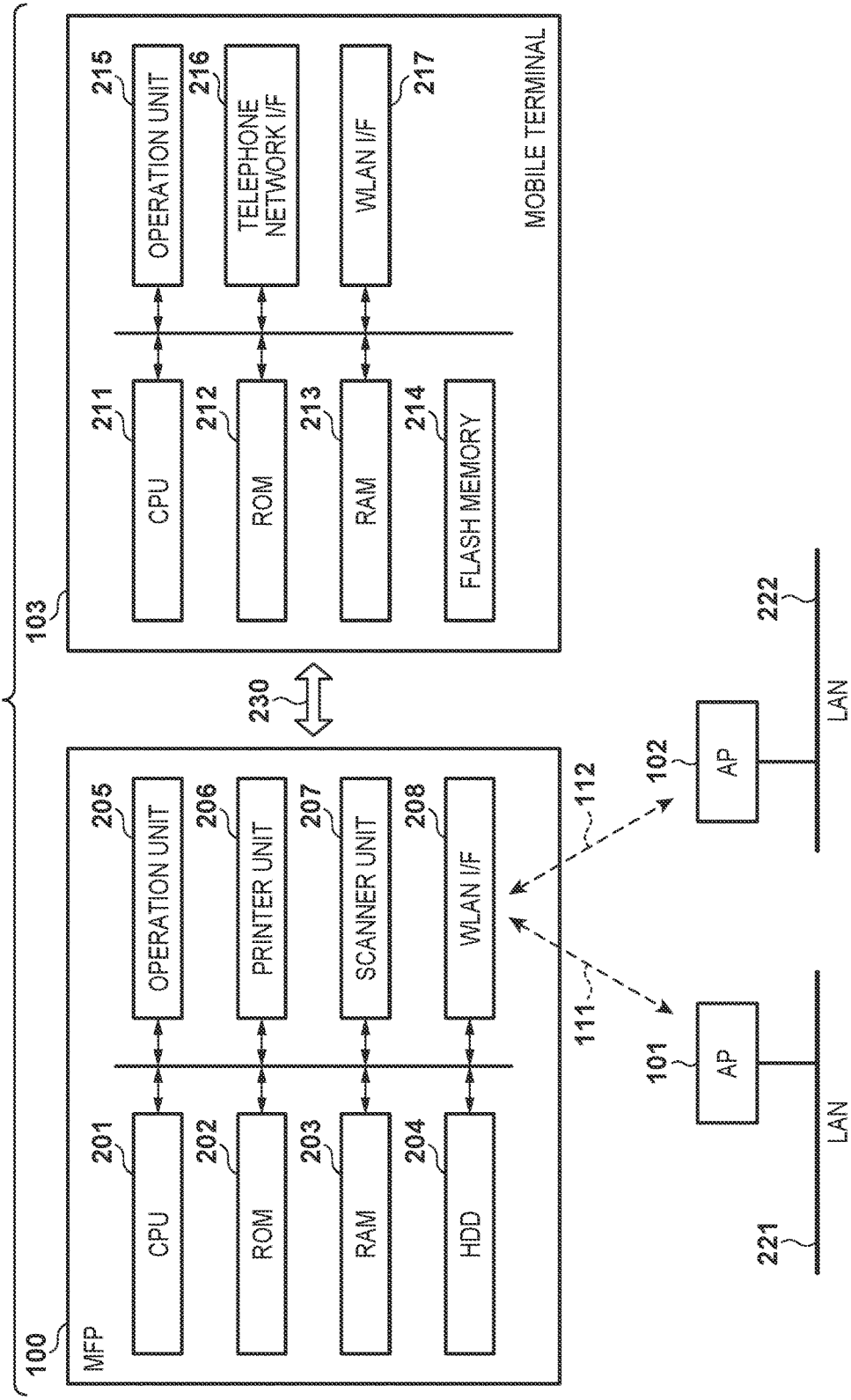
FIG. 2 is block diagram showing an example of the hardware arrangements of an MFP 100 and a mobile terminal 103.

FIG. 2 is a block diagram showing an example of the hardware arrangements of the MFP 100 and the mobile terminal 103 according to the present embodiment. The MFP 100 includes a CPU 201, a ROM 202, a RAM 203, an HDD 204, an operation unit 205, a printer unit 206, a scanner unit 207, and a wireless LAN (WLAN) interface (I/F) 208. These devices in the MFP 100 can communicate with each other via a system bus.

The CPU 201 controls the overall operation of the MFP 100. The CPU 201 reads out and executes control programs stored in the ROM 202 to implement various kinds of functions that the MFP 100 has, such as a print function, a copy function, a scan function, and the like. The RAM 203 is a volatile memory used as a work area and the like for the CPU 201 to execute various kinds of programs. The HDD 204 is a nonvolatile storage device that stores various kinds of programs and data.

The operation unit 205 includes a display that has a touch panel function and may further include hard keys such as a ten-key pad. The printer unit 206 prints an image on a sheet based on image data received from an external apparatus or image data generated by the scanner unit 207. The scanner unit 207 optically reads an image of a document and generates image data corresponding to the image.

The WLAN I/F 208 is a wireless NIC (network interface card) that has a WLAN communication function. The WLAN I/F 208 can connect to a wireless AP such as the AP 101 or 102 and can communicate with an external apparatus via the connected wireless AP. The WLAN I/F 208 has a software access point (software AP) function to cause the MFP 100 to operate as a wireless AP.

More specifically, the WLAN I/F 208 can operate in a software AP mode (to be referred to as "AP mode" hereinafter) and an infrastructure mode. The AP mode (first mode) is an operation mode that causes the MFP 100 to operate as a wireless AP and performs wireless direct connection with an external apparatus (mobile terminal 103 or the like) that has the WLAN communication function. The infrastructure mode (second mode) is an operation mode that causes the MFP 100 to operate as a wireless terminal and connects to a network (LAN 221, 222, or the like) by connecting to a wireless AP (AP 101, 102, or the like). Note that the AP mode and the infrastructure mode are nonexclusive, and the WLAN I/F 208 can simultaneously operate in both modes. In this manner, the WLAN I/F 208 is an example of a wireless interface capable of operating in the AP mode (first mode) and the infrastructure mode (second mode).

The WLAN I/F 208 can simultaneously activate a plurality of wireless APs (virtual APs) each corresponding to a different SSID and cause the APs to operate on the MFP 100. Each of the plurality of wireless APs to be activated on the MFP 100 may be set with a different KEY (an encryption key, a password, or a passphrase) for each SSID. Each of the plurality of wireless APs may use a different WLAN standard or may have a different level of security. In the MFP 100 according to the present embodiment, a dedicated wireless AP (specific AP) for an external apparatus such as the mobile terminal 103 to use the WLAN setting service, and a wireless AP for normal wireless direct connection which is used to, for example, input a job to the MFP 100 may be simultaneously activated.

<Hardware Arrangement of Mobile Terminal 103>

The mobile terminal 103 includes a CPU 211, a ROM 212, a RAM 213, a flash memory 214, an operation unit 215, a telephone network I/F 216, and a WLAN I/F 217. These devices in the mobile terminal 103 can communicate with each other via a system bus. Note that in addition to the devices shown in FIG. 2, the mobile terminal 103 includes various kinds of devices such as a loudspeaker, a microphone, a camera 219, a GPS receiver, and the like.

The CPU 211 controls the overall operation of the mobile terminal 103. The CPU 211 implements various kinds of functions of the mobile terminal 103 by reading out and executing control programs stored in the ROM 212. The RAM 213 is a volatile memory used as a work area or the like for the CPU 211 to execute various kinds of programs. The flash memory 214 is a nonvolatile memory that stores various kinds of programs and data. The operation unit 215 includes a display that has a touch panel function.

The telephone network I/F 216 is a wireless I/F to perform wireless communication by a mobile communication standard such as 3G, LTE, and LTE-Advanced. The telephone network I/F 216 can wirelessly connect to a wireless base station to allow the mobile terminal 103 to access a mobile-telephone network.

The WLAN I/F 217 is, like the WLAN I/F 208, a wireless NIC that has a WLAN communication function. The WLAN I/F 217 can connect to a wireless AP such as the AP 101 or 102 and communicate with an external apparatus via the wireless AP. In a case where a wireless AP is operating by the software AP mode in the MFP 100, the WLAN I/F 217 can establish a wireless direct connection to the MFP 100 by connecting to the wireless AP.

<Software Arrangement of MFP 100>

Figure 3A:
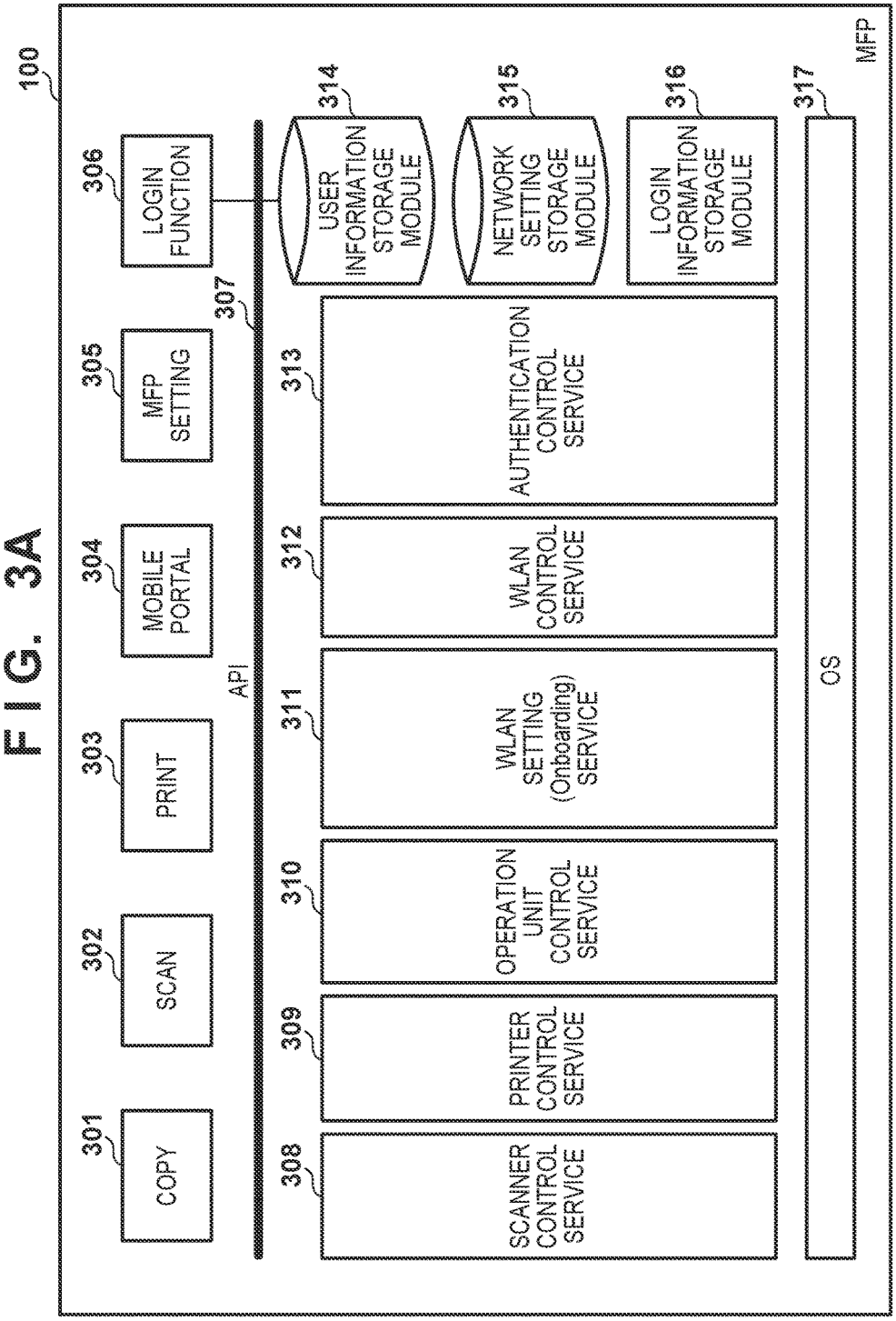
FIG. 3A is a block diagram showing an example of the software arrangement of the MFP 100.

FIG. 3A is a block diagram showing an example of the software arrangement of the MFP 100. The MFP 100 includes, as the applications that operate on a platform (an OS 317), applications such as copy 301, scan 302, print 303, mobile portal 304, MFP setting 305, and login function 306. These applications can communicate with various kinds of services via an application program interface (API) 307 and can activate and stop various kinds of services. The MFP 100 includes, as services that can communicate with the respective applications, a scanner control service 308, a printer control service 309, an operation unit control service 310, a WLAN setting (Onboarding) service 311, a WLAN control service 312, and an authentication control service 313.

The MFP 100 includes, as the software arrangement, a user information storage module 314, a setting information storage module 315, and a login information storage module 316. The user information storage module 314 holds user information. The setting information storage module 315 holds information related to the network settings which are used by the MFP 100 to connect to a network (wireless AP). The network setting is manually performed by a user via the operation unit 215 or performed from the mobile terminal 103 using the WLAN setting service 311. The login information storage module 316 holds the user information of a user who has logged in to the MFP 100. Note that storage areas corresponding to the user information storage module 314 and the setting information storage module 315 are allocated in the HDD 204, and a storage area corresponding to the login information storage module 316 is allocated in the RAM 203.

Each of the above-described applications provides a user interface (displays an operation screen and accepts an operation on the operation screen in the operation unit 215) that can be operated by the user. The copy 301, the scan 302, and the print 303 are applications for using the copy function, the scan function, and the print function, respectively, of the MFP 100. The MFP setting 305 is an application for performing various settings in the MFP 100.

The mobile portal 304 is an application for performing the network setting of the MFP 100 via the WLAN setting service 311 and the WLAN control service 312. The mobile portal 304 performs activation processing of a specific wireless AP, which is necessary for the mobile terminal 103 to use the WLAN setting service 311, and performs network setting using the WLAN setting service 311. Here, the specific wireless AP (specific AP) is a wireless AP by the software AP mode to use the WLAN setting service 311 and is a wireless AP dedicated to the WLAN setting service 311. The mobile portal 304 can perform activation processing and stop processing of a wireless AP by the above-described software AP mode, by controlling the WLAN I/F 208 via the WLAN control service 312. The WLAN setting service 311 receives a setting request (setting command) from a mobile terminal with which it has established a wireless direct connection and performs the network setting in accordance with the received setting request.

The login function 306 is an application that provides a function for the user to log in to the MFP 100. The login function 306 registers and manages a user account. A user account (user information) managed by the login function 306 is stored in the user information storage module 314. The user information includes, for example, a username, a password, and authority information. The authority information is information that indicates the authority of the corresponding user to use an application (for example, whether the user is allowed to use all applications or is only prohibited from using the mobile portal 304, and the like).

The login function 306 limits the use of the MFP 100 by a user who is not logged in by displaying, on the operation unit 205, an operation screen (an authentication screen 410 of FIG. 4A) for the user who is to use the MFP 100 to log in to the MFP 100. The login function 306 performs user authentication based on the authentication information (username and password) input using the operation screen and the user information stored in the user information storage module 314. If the user is permitted to log in based on the user authentication, the login function 306 stores, in the login information storage module 316, the user information (the username, the password, and the authority information) of the logged-in user. Note that the login function 306 limits the number of users who can simultaneously log in to the MFP 100 to 1 (prevents a plurality of users from simultaneously logging in to the MFP 100).

(Authentication Function of MFP 100)

Here, the authentication function of the MFP 100 will be described in relation to the above-described login function 306. In the MFP 100, as the settings of the authentication function, it is possible to choose among a setting ("no authentication") not to perform user authentication, a setting ("device authentication") to perform user authentication at user login, and a setting ("functional authentication") to perform user authentication for each function.

In the case of "no authentication", confirmation of user authority information is not performed when the user logs in to the MFP 100 and when an application is to be used. In the case of "device authentication", user authority information is confirmed by performing user authentication when the user logs in to the MFP 100. In the case of "functional authentication", user authentication is performed when the use of an application (for example, the mobile portal 304) is started (when activation of an application is instructed). Note that, in the present embodiment, whether or not user authentication is to be performed can be set for each application. For example, it is possible to set whether or not to perform user authentication for the mobile portal 304.

<Software Arrangement of Mobile Terminal 103>

Figure 3B:
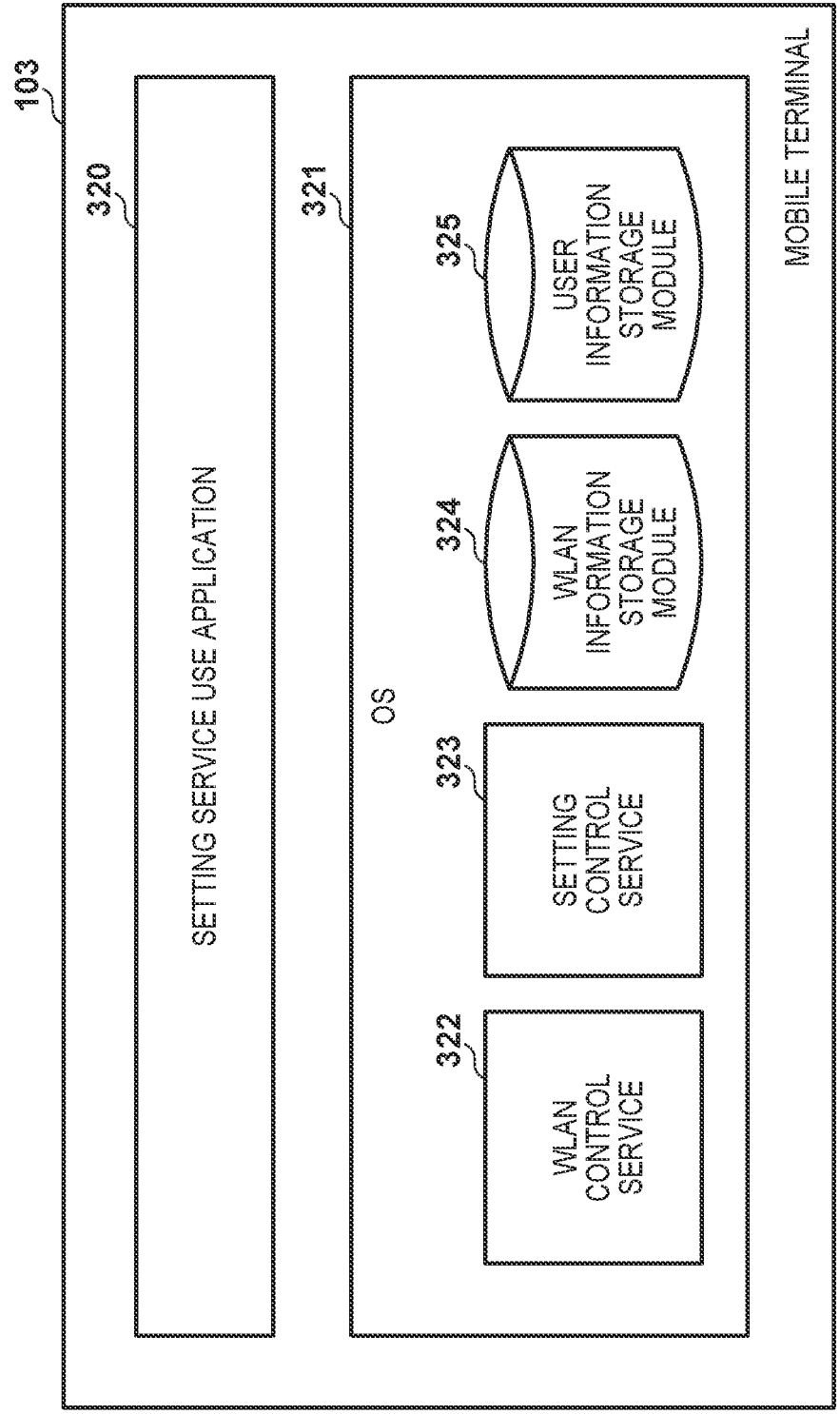
FIG. 3B is a block diagram showing an example of the software arrangement of the mobile terminal 103.

FIG. 3B is a block diagram showing an example of the software arrangement of the mobile terminal 103. The mobile terminal 103 includes an OS 321 and includes, as an application that operates on the OS 321, a setting service use application 320. The mobile terminal 103 includes, as services that operate on the OS 321, a WLAN control service 322 and a setting control service 323 and includes, as storage modules, a WLAN information storage module 324 and a user information storage module 325.

The setting service use application 320 is an application for using the WLAN setting service 311 operating in the MFP 100. The setting service use application 320 performs the network setting of the MFP 100 by establishing, via the WLAN control service 322 and the setting control service 323, a wireless direct connection to the specific wireless AP which is for the WLAN setting service 311 and which is activated in the MFP 100.

The WLAN information storage module 324 holds the SSID and the KEY of the wireless AP to which the mobile terminal 103 (WLAN I/F 217) has successfully connected. The user information storage module 325 holds the user information which is to be used in the user authentication processing (step S609 of FIG. 6B) (to be described later) for using the WLAN setting service 311. Note that the storage areas corresponding to the WLAN information storage module 324 and the user information storage module 325 are allocated in the flash memory 214.

<Onboarding Service>

An Onboarding service corresponding to the WLAN setting service 311 in the present embodiment is a service that allows an external apparatus such as the mobile terminal 103 to perform network setting to cause the MFP 100 to connect to a network (wireless AP). In a case where the Onboarding service is used, it is possible to, by a request (command) transmitted from the mobile terminal 103 to the MFP 100, to cause the MFP 100 to a network or to cause the connection destination network of the MFP 100 to be changed.

The Onboarding service is implemented by communication between a device (Onboarder) that transmits a request for network setting of a connection destination and a device (Onboardee) that receives the request and performs the network setting. In the present embodiment, a wireless direct connection is used as the wireless connection between the mobile terminal 103 serving as the Onboarder and the MFP 100 serving as the Onboardee. Hence, the MFP 100 needs to activate a wireless AP by the software AP mode to allow the wireless direct connection from the mobile terminal 103. In the present embodiment, the MFP 100 activates a specific wireless AP for the Onboarding service.

The MFP 100 (Onboardee) accepts a wireless direct connection from the mobile terminal 103 (Onboarder) in a state in which the specific wireless AP has been activated. If the connection with the mobile terminal 103 has been established, the MFP 100 receives a setting request including the designation of a wireless AP to be connected from the mobile terminal 103. Also, the MFP 100 performs connection by the above-described infrastructure mode to the wireless AP that was designated in the received setting request. In this manner, the MFP 100 connects to the network or changes the connection destination network by the Onboarding service.

In the present embodiment, the mobile terminal 103 holds, in advance, a list of wireless APs which are to be connection destination candidates of the MFP 100 by the infrastructure mode. The mobile terminal 103 transmits, to the MFP 100, a setting request in which a wireless AP selected by the user based on such a list has been designated. At this time, if the designated wireless AP cannot be discovered, the MFP 100 does not perform the network setting but transmits, to the mobile terminal 103, an error notification indicating that the network setting corresponding to the setting request has failed. Note that the MFP 100 may search for neighboring wireless APs by an instruction from the mobile terminal 103 and transmit a list of discovered wireless APs to the mobile terminal 103 so that the mobile terminal 103 can designate a wireless AP based on the received list.

<Mobile Portal Application>

Figure 4A:
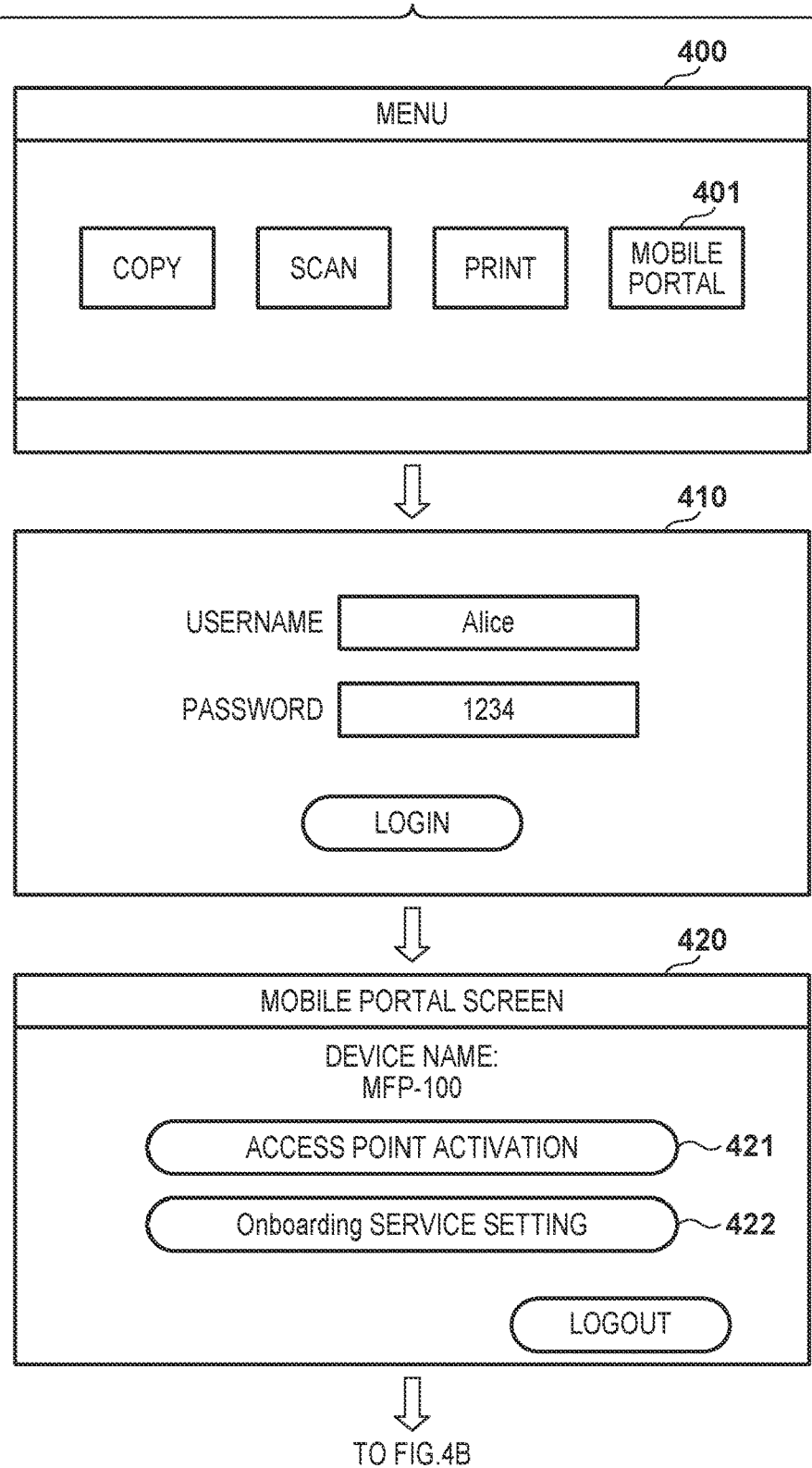

FIGS. 4A and 4B show an example of operation screens displayed to be on the operation unit 205 when the mobile portal 304 is used on the MFP 100. Here, the mobile portal application (mobile portal 304) will be described with reference to FIGS. 4A and 4B. Note that the function of the mobile portal 304 is implemented in the MFP 100 by the CPU 201 reading out, to the RAM 203, an application program stored in the ROM 202 or the HDD 204 and executing the program.

When the user selects (touches) a button 401 on a menu screen 400 displayed on the operation unit 205, the CPU 201 activates the mobile portal 304. Here, if the execution of user authentication has been set for the mobile portal 304 to serve as the above-described "functional authentication", the CPU 201 displays the authentication screen 410 on the operation unit 205. If the user authentication based on the authentication information input to the authentication screen 410 is successful, the CPU activates the mobile portal 304 and displays an operation screen 420 of the mobile portal 304 on the operation unit 205.

The operation screen (mobile portal screen) 420 includes a button 421 for activating a wireless AP by the above-described software AP mode and a button 422 for performing setting related to the WLAN setting service 311 (Onboarding service). If the button 421 is selected, the mobile portal 304 changes the display screen of the operation unit 205 to an operation screen 430. If the button 422 is selected, the mobile portal 304 changes the display screen of the operation unit 205 to an operation screen 440.

The operation screen (mobile portal screen) 430 includes pieces of AP information 431 and 432 that indicate the SSIDs and the KEYs of respective wireless APs activated in the MFP 100 as the wireless APs by the software AP mode. The user can individually instruct, on the operation screen 430, activation or stop of the wireless APs corresponding to the pieces of AP information 431 and 432. In the present embodiment, the AP information 431 corresponds to a wireless AP for a normal wireless direct connection which is used for the purpose of, for example, inputting a job to the MFP 100 and the AP information 432 corresponds to a wireless AP for the WLAN setting service 311.

The operation screen (mobile portal screen) 440 is used to perform setting for controlling access to the WLAN setting service 311 (Onboarding service) by an external apparatus such as the mobile terminal 103. In the operation screen 440, it is possible to set whether or not to enable the four functions of "direct connection limitation", "service use limitation", "password authentication", and "user authentication".

"Direct connection limitation" is a function that limits, to one, the number of external apparatuses that can simultaneously establish a wireless direct connection to the specific wireless AP (specific AP) for the WLAN setting service 311. Note that if user authentication using the authentication screen 410 is to be performed, the use of the WLAN setting service 311 can be limited to only an administrator user to prevent unauthorized use of the service by another user.

"Service use limitation" is a function that limits the number of external apparatuses that can simultaneously use the WLAN setting service 311 to one when the WLAN setting service 311 is to be used by an external apparatus that established a wireless direct connection to the specific AP. Note that when the user authentication using the authentication screen 410 is to be performed, the use of the WLAN setting service 311 can be limited to only the administrator user to prevent unauthorized use of the service by another user.

"Password authentication" is a function of displaying, when a setting request related to network settings is received from the external apparatus that established a wireless direct connection to the specific AP, a predetermined password on the operation unit 205 and performing authentication of the external apparatus based on the displayed password. If the password displayed on the operation unit 205 and the password received from the external apparatuses match, the mobile portal 304 causes the WLAN setting service 311 to execute network setting in accordance with the setting request. Note that although a default password has been set in the MFP 100 in advance, the user can change the password by using the mobile portal 304.

"User authentication" is a function that performs authentication of the user operating the external apparatus that established the wireless direct connection to the specific AP. When "user authentication" has been enabled, the mobile portal 304 performs user authentication using the authentication control service 313. The authentication control service 313 performs user authentication based on the authentication information received from the external apparatus that established the wireless direct connection to the specific AP and the user information stored in the login information storage module 316. The mobile portal 304 causes the WLAN setting service 311 to execute network setting in accordance with the setting request in a case where user authentication has succeeded.

<Setting Service Use Application>

Figure 5:
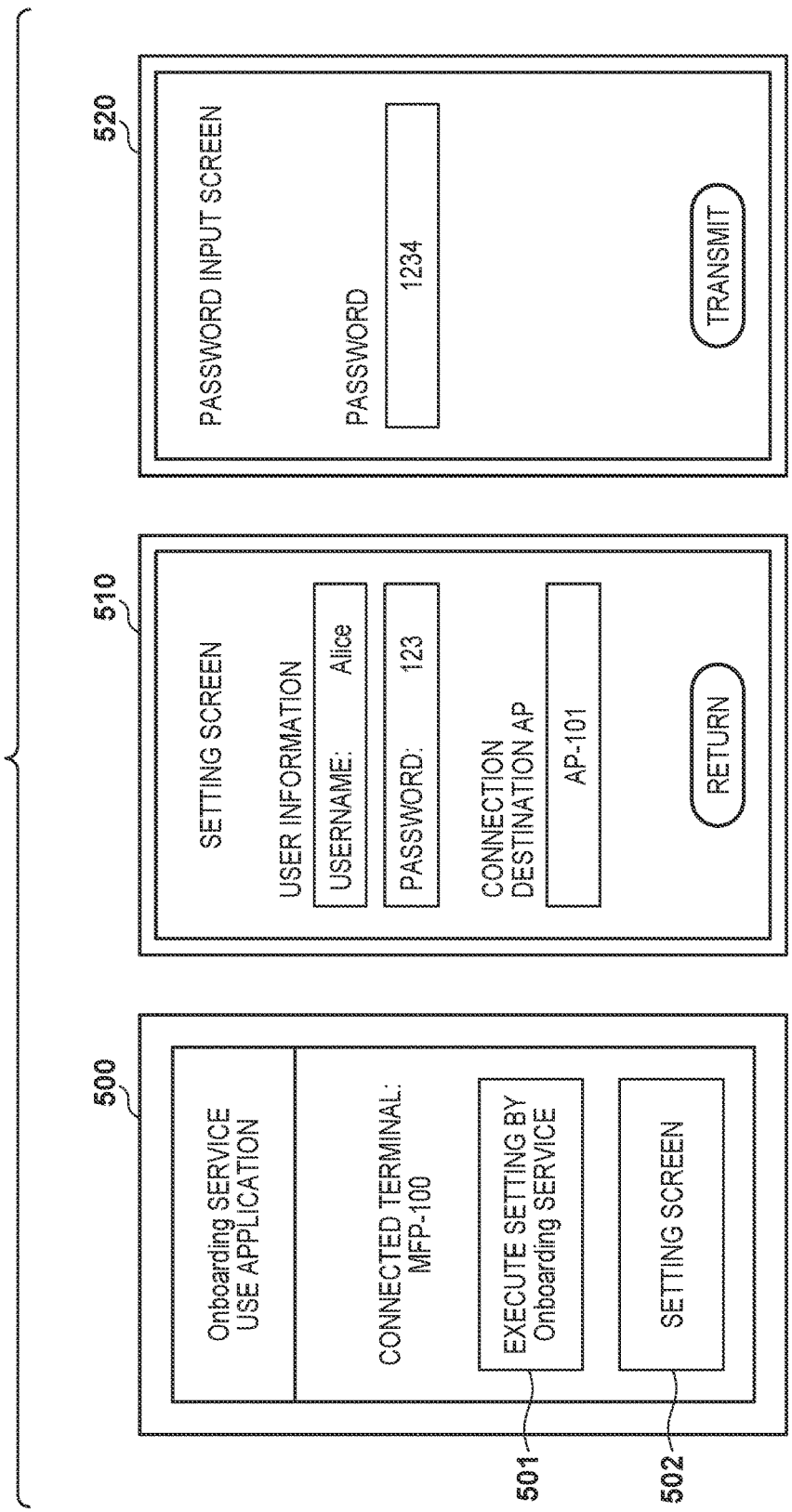
FIG. 5 shows an example of operation screens to be displayed on an operation unit 215 when a setting service use application 320 is to be used in the mobile terminal 103.

FIG. 5 shows an example of operation screens that are displayed on the operation unit 215 when the setting service use application 320 is to be used on the mobile terminal 103. Here, the setting service use application 320 for using the WLAN setting service 311 will be described with reference to FIG. 5. Note that the function of the application is implemented in the mobile terminal 103 by the CPU 211 reading out, to the RAM 213, an application program stored in the ROM 212 or the flash memory 214 and executing the program.

If the setting service use application 320 is activated, an operation screen 500 is displayed on the operation unit 215. The operation screen 500 includes the name of an MFP (the MFP 100 in the present embodiment) which is currently the target of wireless direct connection. The operation screen 500 also includes a button 501 for instructing the execution of network setting by the WLAN setting service 311 and a button 502 for instructing the display of the setting screen. If the button 502 is selected, the setting service use application 320 displays the setting screen 510 on the operation unit 215.

In a setting screen 510, it is possible to input the authentication information (the username and the password) to be used for the above-described user authentication in the MFP 100 and the wireless AP (connection destination AP) to which the MFP 100, serving as the target of the wireless direct connection, is to connect by the infrastructure mode. Note that the connection destination AP may be, for example, selected from a predetermined list from a pull-down menu. If the button 501 is selected on the operation screen 500 after the designation of the connection destination AP is performed on the setting screen 510, the setting service use application 320 transmits, to the MFP 100, a setting request in which the connection destination AP is designated.

If transmission of a password is requested from the MFP 100, the setting service use application 320 accepts input of the password from the user by displaying an input screen 520 on the operation unit 215. Furthermore, the setting service use application 320 transmits the input password to the MFP 100.

<Processing Procedure>

Figure 6A:
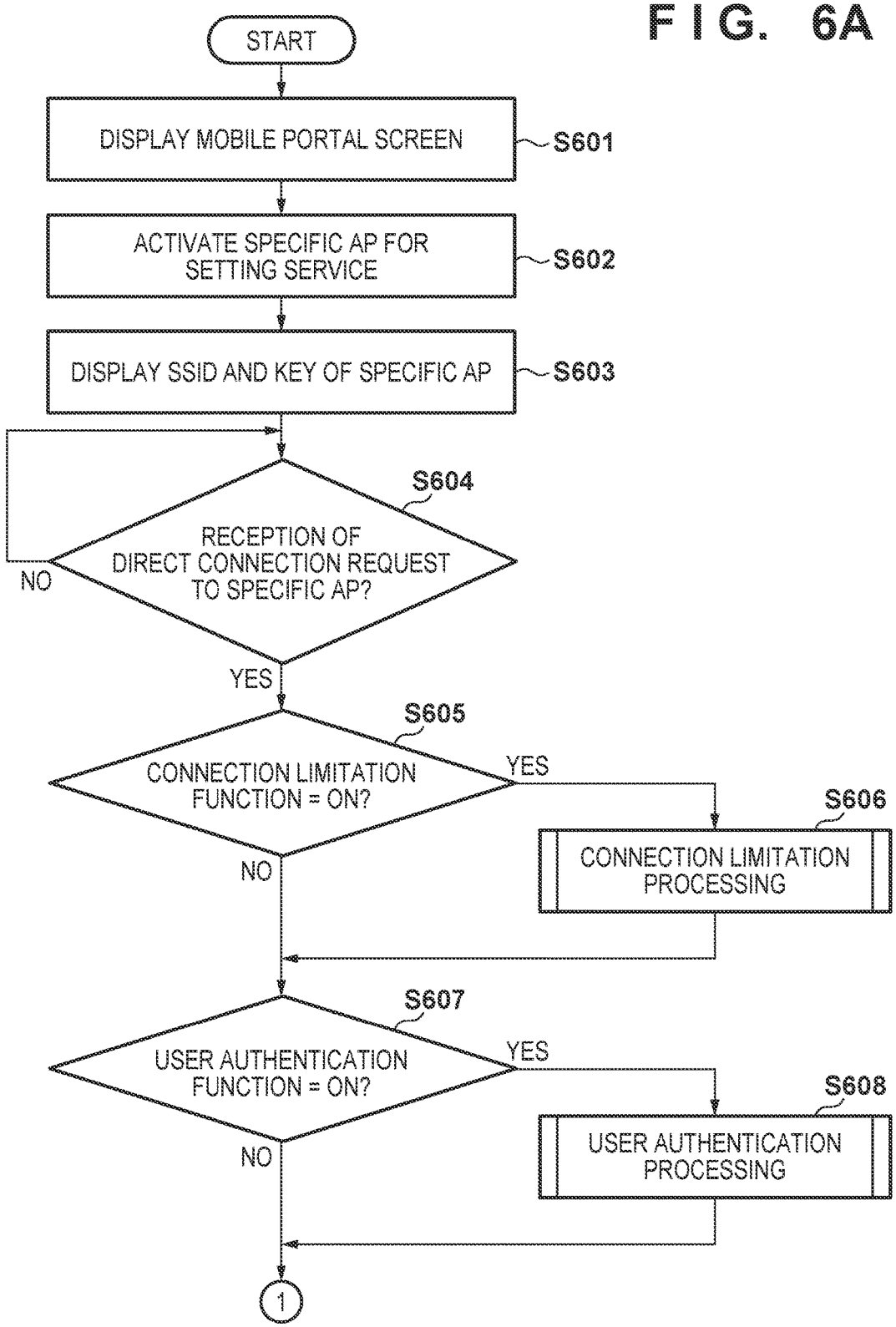
FIGS. 6A and 6B are flowcharts showing a processing procedure in the MFP 100.
Figure 6B:
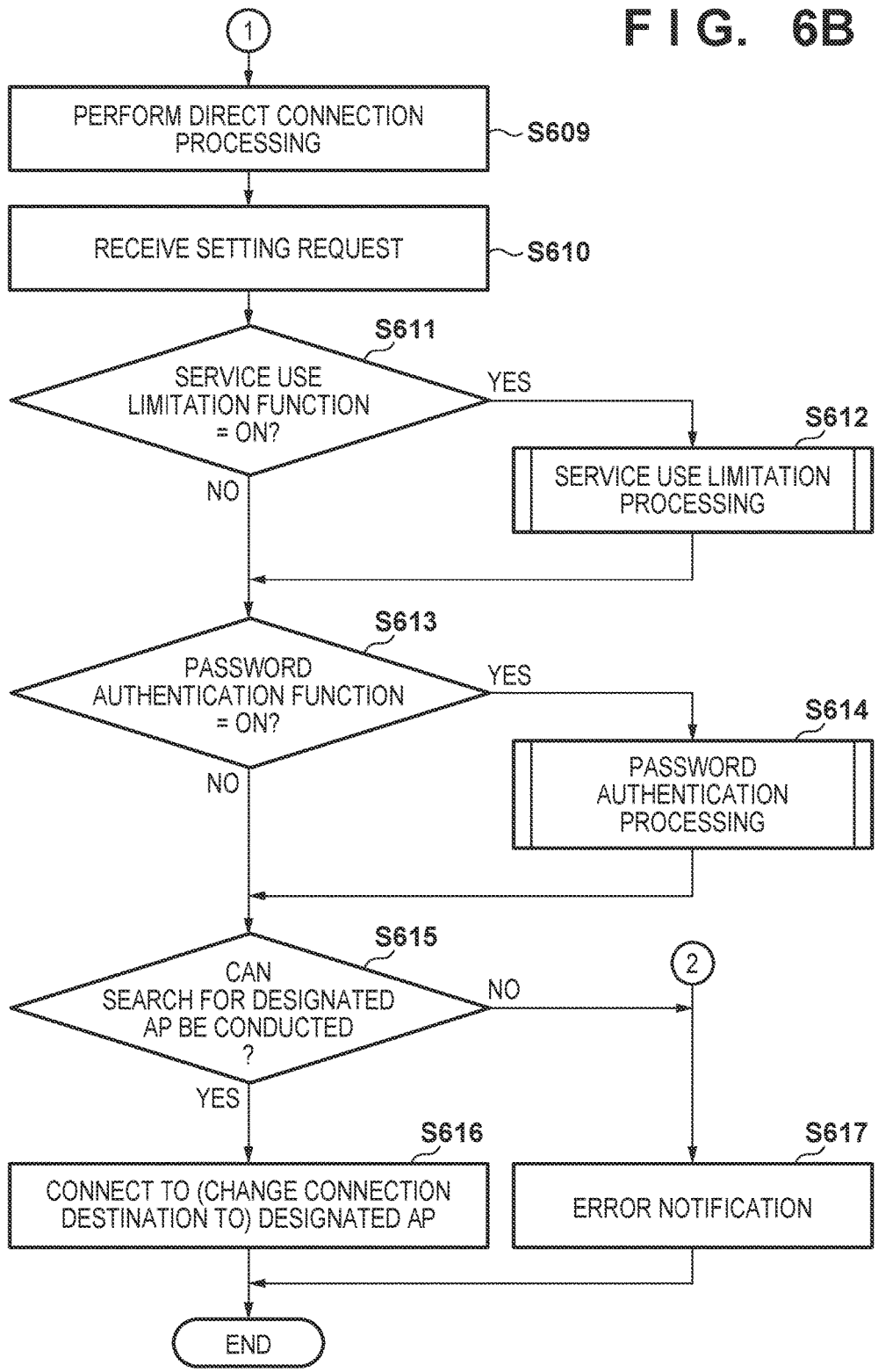
Figure 7A:
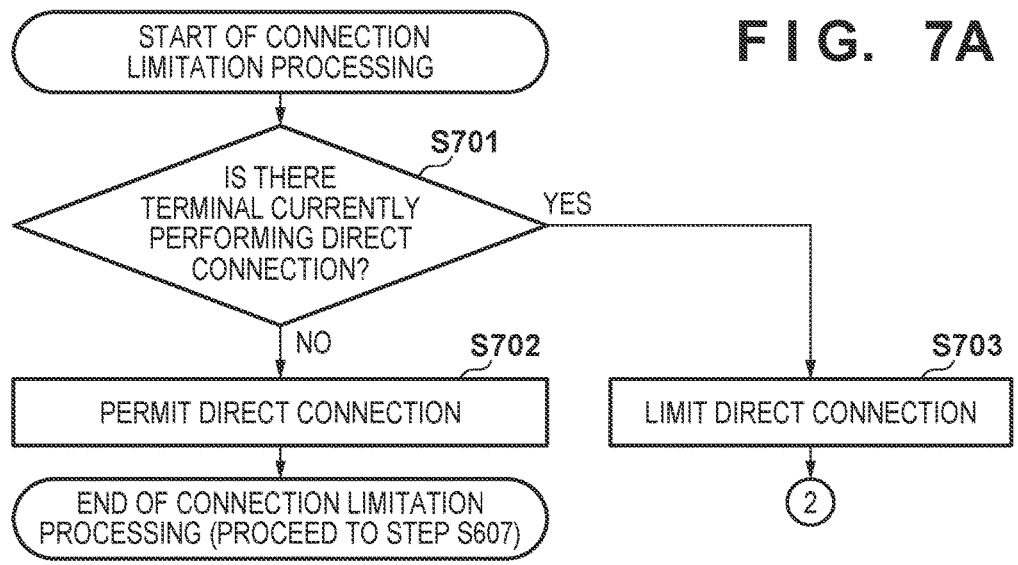
FIG. 7A is a flowchart showing a procedure of connection limitation processing.
Figure 7B:
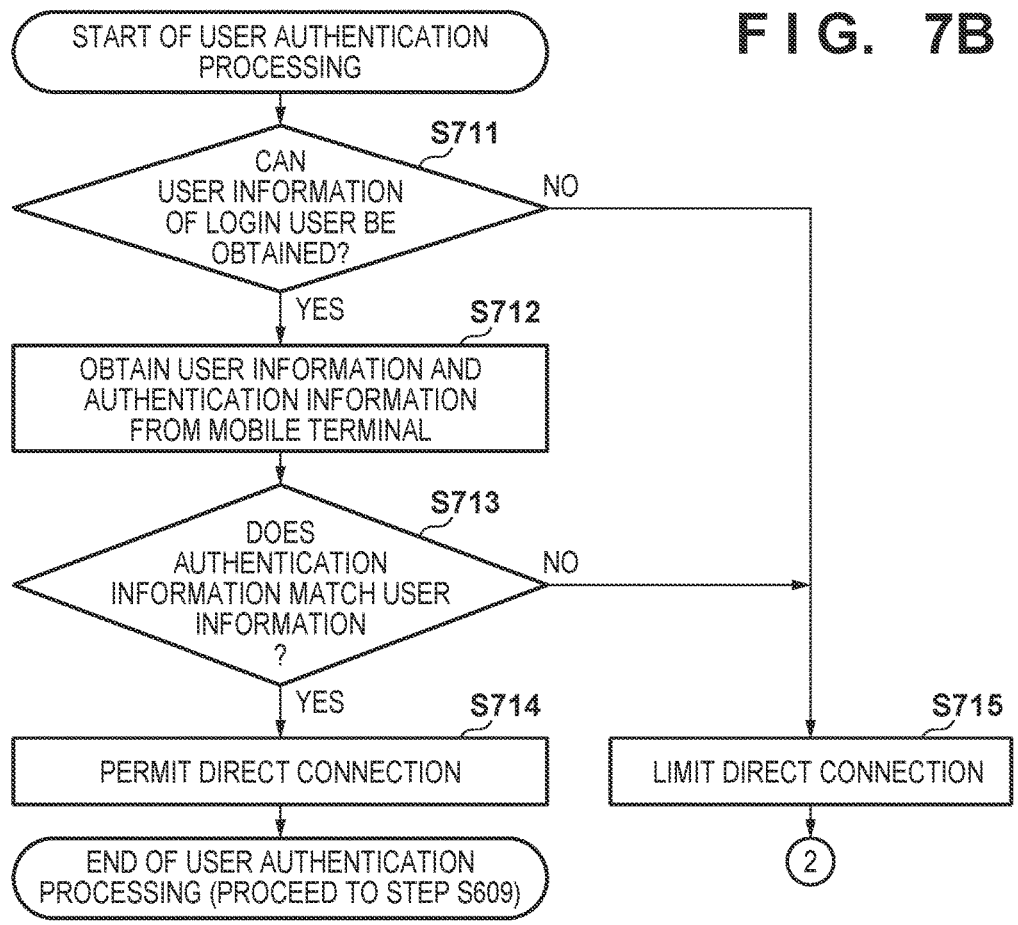
FIG. 7B is a flowchart showing a procedure of user authentication processing.
Figure 8A:
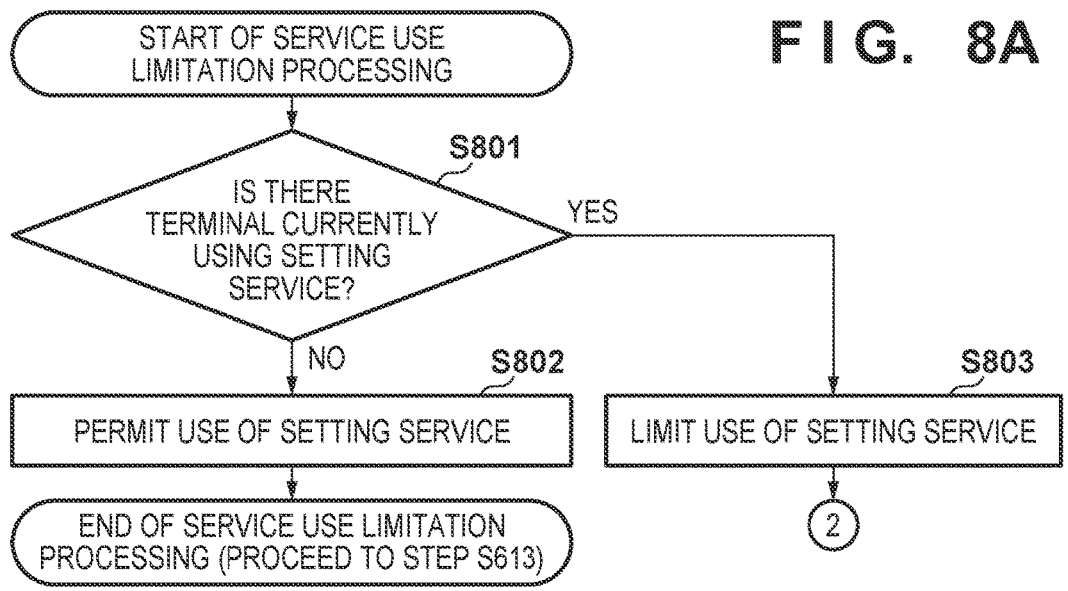
FIG. 8A is a flowchart showing a procedure of service use limitation processing.
Figure 8B:
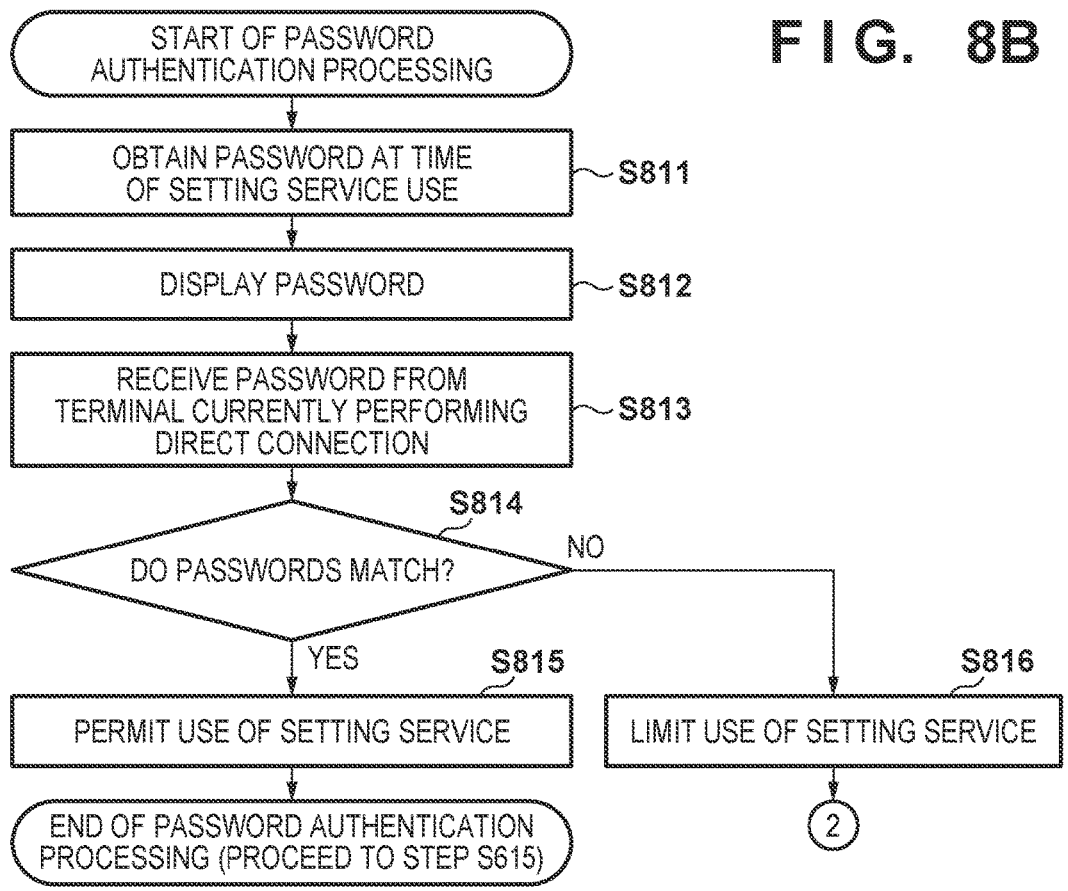
FIG. 8B is a flowchart showing a procedure of password authentication processing.

A processing procedure which is to be executed by the MFP 100 when performing network setting to the MFP 100 from the mobile terminal 103 by using the WLAN setting service 311 according to the present embodiment will be described next with reference to FIGS. 6A, 6B, 7A, 7B, 8A, and 8B. A processing procedure to be executed by the MFP 100 will be described. Each step of processing in FIGS. 6A and 6B is implemented by the CPU 201 reading out, to the RAM 203, a program (including the application program of the mobile portal 304) stored in the ROM 202 or the HDD 204 and executing the program. Note that the processing procedure described below is applicable to a case in which network setting is performed to cause the MFP 100 to connect to a network and to a case in which network setting is performed to change the connection destination network of the MFP 100.

In the MFP 100 according to the present embodiment, enabling/disabling (ON/OFF) of each of the functions of direct connection limitation, service use limitation, password authentication, and user authentication is preset as described with reference to FIGS. 4A and 4B. The connection limitation processing in step S606, the service use limitation processing in step S612, the password authentication processing in step S614, and the user authentication processing in step S608 are executed if the respective functions have been enabled (are in an ON state).

When the mobile portal 304 is activated in the MFP 100, user authentication to authenticate the user operating the MFP 100 is performed. If the button 421 is selected on the mobile portal screen 420 after the completion of user authentication, the CPU 201 displays, in step S601, the mobile portal screen 430 on the operation unit 205. If the activation of a specific AP, which is the wireless AP for the WLAN setting service 311, is instructed by the authenticated user on the operation screen 420, the CPU 201 activates, in step S602, the specific AP by the software AP mode in accordance with the instruction. Furthermore, in step S603, the CPU 201 displays the SSID and the KEY (AP information 432) which are the AP information of the activated specific AP on the operation unit 205. As a result, the user can be notified of the SSID and the KEY necessary for the mobile terminal 103 to perform wireless direct connection to the specific AP.

The user operates the operation unit 215 of the mobile terminal 103 so that the mobile terminal 103 will perform wireless direct connection to the MFP 100 by using the SSID and the KEY displayed on the operation unit 205 of the MFP 100. As a result, the mobile terminal 103 transmits a connection request including the SSID and the KEY corresponding to the specific AP, for the wireless direct connection.

In the MFP 100, in step S604, the CPU 201 determines whether a connection request which includes the SSID and the KEY corresponding to the specific AP has been received from an external apparatus via the WLAN I/F 208. Upon receiving such a connection request via the WLAN I/F 208, the CPU 201 advances the process to step S605. As will be described below, the CPU 201 executes, in steps S605 to S614, processing to limit the number of external apparatuses (mobile terminals) that can use the WLAN setting service 311 by connecting to the specific AP.

Note that, as described above, in the MFP 100, a plurality of wireless APs including not only the specific AP but also the wireless AP used for inputting a job to the MFP 100 may be simultaneously activated by the software AP mode. In this case, the CPU 201 executes, for only the specific AP, the processing to limit the number of external apparatuses (mobile terminals) that can use the WLAN setting service 311. As a result, it is possible to allow the external apparatuses to establish the wireless direct connection to the MFP 100 to input a job while appropriately controlling access to the WLAN setting service 311 by the external apparatuses.

(Connection Limitation Processing)

In step S605, the CPU 201 determines whether or not the connection limitation function has been enabled. If the connection limitation function has been enabled, the process advances to step S606. If the connection limitation function has been disabled, the process advances to step S607. In step S606, the CPU 201 executes, in accordance with the processing procedure shown in FIG. 7A, the connection limitation processing, which is the processing to limit the number of external apparatuses (mobile terminals) that can connect to the specific AP to one.

More specifically, in step S701, the CPU 201 determines whether or not there is already an external apparatus (mobile terminal) that has established a wireless direct connection to the specific AP, when the connection request is received. If there is no external apparatus that has established a wireless direct connection to the specific AP, the CPU 201 advances the process to step S702. Otherwise, the process advances to step S703.

In step S702, the CPU 201 permits the wireless direct connection to the specific AP based on the received connection request and advances the process to step S607. On the other hand, in step S703, the CPU 201 limits (rejects) the wireless direct connection to the specific AP based on the received connection request and advances the process to step S617. In step S617, the CPU 201 transmits an error notification indicating the rejection of the connection request to the mobile terminal 103 which is the transmission source of the connection request, and ends the processing.

(User Authentication Processing)

In step S607, the CPU 201 determines whether or not the user authentication function has been enabled. If the user authentication function has been enabled, the process advances to step S608. Otherwise, the process advances to step S609. The user authentication processing in step S608 is executed in accordance with the processing procedure shown in FIG. 7B.

More specifically, in step S711, the CPU 201 determines whether or not the login information of a user who is already logged in to the MFP 100 has been obtained from the login information storage module 316. If the user information has been obtained, the CPU 201 advances the process to step S712. Otherwise, the process advances to step S715.

In step S712, the CPU 201 obtains the user information stored in the login information storage module 316 and the authentication information from the mobile terminal 103 which is the transmission source of the connection request. This authentication information corresponds to, for example, the user information that has been preset on the setting screen 510 of FIG. 5. The mobile terminal 103 may transmit the authentication information to the MFP 100 by including the authentication information in the connection request for the wireless direct connection to the specific AP. Alternatively, the mobile terminal 103 may transmit the authentication information in response to a request from the MFP 100, after the transmission of the connection request.

Subsequently, in step S713, the CPU 201 executes user authentication by determining whether or not the authentication information obtained from the mobile terminal 103, with which it is currently connected by wireless direct connection, matches the user information obtained from the login information storage module 316. That is, the CPU 201 determines whether or not the user of the mobile terminal 103 corresponding to the authentication information received from the mobile terminal 103 and the user authenticated by the MFP 100 match. If the authentication information matches the user information, the CPU 201 advances the process to step S714. Otherwise, the process advances to step S716.

In step S714, the CPU 201 permits the wireless direct connection to the specific AP based on the received connection request and advances the process to step S609. On the other hand, in step S715, the CPU 201 limits (rejects) the wireless direct connection to the specific AP based on the received connection request and advances the process to step S617. In step S617, the CPU 201 transmits an error notification indicating the rejection of the connection request to the mobile terminal 103 which is the transmission source of the connection request, and ends the processing.

By virtue of such user authentication processing, it is possible to prevent the WLAN setting service 311 from being used by a different user against the intention of the user who is currently operating the MFP 100 and the mobile terminal 103. Hence, it becomes possible to prevent a conflict from occurring between the setting requests (instructions) to the MFP 100 transmitted from a plurality of external apparatuses (mobile terminals).

(Direct Connection Processing)

Subsequently, in step S609, the CPU 201 performs connection processing to establish a wireless direct connection between the specific AP and the mobile terminal 103 which is the transmission source of the connection request received in step S604. If the connection is established, the CPU 201 advances the process to step S610. In step S610, the CPU 201 receives, by the WLAN setting service 311, a setting request including the designation of the wireless AP to which the MFP 100 is to be connected by the infrastructure mode, via the specific AP from the mobile terminal 103 with which it is currently connected by the wireless direct connection.

(Service Use Limitation Processing)

Next, in step S611, the CPU 201 determines whether or not the service use limitation function has been enabled. If the service use limitation function has been enabled, the process advances to step S612. If the service use limitation has been disabled, the process advances to step S613. In step S612, after establishing the wireless direct connection with the mobile terminal 103, the CPU 201 executes, in accordance with the processing procedure shown in FIG. 8A, the service use limitation processing which is processing to limit the number of external apparatuses (mobile apparatuses) that can use the WLAN setting service 311 to one.

More specifically, in step S801, the CPU 201 determines whether or not there is already an external apparatus (mobile apparatus) that is currently using the WLAN setting service 311. For example, this corresponds to a case in which the connection limitation function has been disabled and a mobile terminal other than the mobile terminal 103 has established a wireless direct connection to the specific AP and has transmitted, before the mobile terminal 103, a setting request to the MFP 100 by using the WLAN setting service 311. In such a case, since there is already a mobile terminal using the WLAN setting service 311, the CPU 201 advances the process to step S803. If there is no such mobile terminal, the CPU 201 advances the process to step S802.

In step S802, the CPU 201 permits the use of the WLAN setting service 311 by the mobile terminal 103 connected to the specific AP, that is, permits the execution of network setting in accordance with the received setting request, and advances the process to step S613. On the other hand, in step S803, the CPU 201 limits (rejects) the use of the WLAN setting service 311 by the mobile terminal 103 connected to the specific AP, and advances the process to step S617. In step S617, the CPU 201 transmits an error notification indicating the rejection of the use of the WLAN setting service 311 to the mobile terminal 103 connecting by the wireless direct connection, and ends the processing.

(Password Authentication Processing)

Next in step S613, the CPU 201 determines whether or not the password authentication function has been enabled. If it has been enabled, the process advances to step S614. If the password authentication function has been disabled, the process advances to step S615. The password authentication processing of step S614 is executed in accordance with the processing procedure shown in FIG. 8B.

More specifically, in step S811, the CPU 201 obtains the password to use the WLAN setting service 311. As described above, this password is the default password which has been preset or a password which has been subsequently changed by the user and is unique to the user (different for each user). Upon obtaining the password stored in the HDD 204 or the like, the CPU 201 displays, in step S812, the obtained password on the operation unit 205 and transmits a password transmission request to the mobile terminal 103. Upon receiving the request, the mobile terminal 103 displays the input screen 520 on the operation unit 215 to prompt the user to input the password displayed on the operation unit 205 of the MFP 100. Furthermore, the mobile terminal 103 transmits the password input by the user to the MFP 100.

As a result, in step S813, the CPU 201 receives the password from the mobile terminal 103 currently connecting to the specific AP by wireless direct connection. Subsequently, in step S814, the CPU 201 determines whether or not the password received from the mobile terminal 103 matches the password displayed on the operation unit 205. If the passwords match, the process advances to step S815. Otherwise, the process advances to step S816.

In step S815, the CPU 201 permits the use of the WLAN setting service 311 by the mobile terminal 103 connecting to the specific AP, that is, permits the execution of network setting in accordance with the received setting request, and the process advances to step S615. On the other hand, in step S806, the CPU 201 limits (rejects) the use of the WLAN setting service 311 by the mobile terminal 103 connecting to the specific AP, and the process advances to step S617. In step S617, the CPU 201 transmits an error notification indicating the rejection of the use of the WLAN setting service 311 to the mobile terminal 103 connecting by the wireless direct connection, and ends the processing.

In this kind of password authentication processing, by changing the default password to a user unique password, it is possible to prevent the WLAN setting service 311 from being used against the intention of the user of the mobile terminal 103 by a user other than the user of the mobile terminal. Note that if the above-described user authentication processing (step S608) has been executed, the CPU 201 may operate so as not to perform the password authentication processing, in order to avoid a redundant execution of the user authentication processing. This can be implemented by arranging, for example, the operation screen 440 so that it will be possible to enable only one of "password authentication" and "user authentication".

(Network Setting Processing)

After the process advances from step S613 or step S614 to step S615, the CPU 201 searches for the wireless AP which was designated in the setting request received in step S610 and to which the MFP 100 is to connect (to newly connect due to the change in the connection destination) by the infrastructure mode. If the designated wireless AP is within the communicable range of the MFP 100, the wireless AP will be discovered. In step S610, the CPU 201 determines whether or not the designated wireless AP has been discovered. If the designated wireless AP has been discovered, the process advances to step S616. Otherwise, the process advances to step S617.

In step S616, the CPU 201 performs network setting in accordance with the setting request received via the specific AP in step S610. The CPU 201 ends the processing when the setting has been completed. More specifically, the CPU 201 controls the WLAN I/F 208 so that the connection to the wireless AP designated in the setting request will be performed by the infrastructure mode. Note that if the MFP 100 is already connected to an external wireless AP by the infrastructure mode, the CPU 201 controls the WLAN I/F 208 so as to change the connection destination wireless AP to the wireless AP designated in the setting request. As a result, if the MFP 100 is not connected to the network, the MFP 100 will be connected to the network, and if the MFP 100 is already connected to one of the wireless APs, the connection destination will be changed to the designated wireless AP (the connection destination network will be changed). Subsequently, the CPU 201 ends the processing.

On the other hand, in step S617, the CPU 201 transmits, to the mobile terminal 103 which is the transmission source of the setting request, an error notification indicating that the search for the wireless AP designated in the setting request was not possible, and the processing ends.

As described above, the MFP 100 according to the present embodiment activates a specific AP by the software AP mode for using the WLAN setting service 311 and receives a connection request to the activated specific AP from the mobile terminal 103 via the WLAN I/F 208. Upon receiving the connection request via the WLAN I/F 208, the MFP executes processing to limit the number of external apparatuses (mobile terminals) that can use the WLAN setting service 311 by connecting to the specific AP. The MFP 100 executes, as such limitation processing, at least one of the connection limitation processing (step S606) and the service use limitation processing (step S612). In addition, the MFP 100 may further execute, as the limitation processing, the user authentication processing (step S608) or the password authentication processing (step S614). According to the present embodiment, in the MFP 100 that has a software AP function and allows an external apparatus to perform network setting, it becomes possible to prevent a conflict from occurring between the setting instructions (setting requests) to the MFP 100 transmitted from a plurality of external apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-007003, filed Jan. 18, 2017, which is hereby incorporated by reference herein in its entirety.

What is claimed is:

1. An image processing apparatus comprising:
a wireless interface configured to operate in a first mode that causes the image processing apparatus to operate as a wireless access point (AP) and in a second mode that causes the image processing apparatus to operate as a wireless client that connects to an external wireless AP;
a memory device storing instructions; and
at least one processor configured to implement the instructions and execute a plurality of tasks, including:
an activating task that activates a specific wireless AP by the first mode for using a setting service that allows an external apparatus to perform setting to cause the image processing apparatus to connect to a network using the second mode;
a connection request receiving task that receives, from an external apparatus via the wireless interface, a connection request to the activated specific wireless AP;
a limiting task, in a case where the connection request is received, a number of external apparatuses that connect to the specific wireless AP using the setting service;
a connection information receiving task that receives information for connecting to the external wireless AP from the external apparatus via the activated specific wireless AP; and
a setting task that, for using the setting service, sets, to the image processing apparatus, information of the external wireless AP to which the wireless client is to connect, based on the received information.

2. The apparatus according to claim 1, wherein the limiting task, in the case where the connection request has been received, limits the number of external apparatuses that connect to the specific wireless AP to one.

3. The apparatus according to claim 2, wherein the plurality of tasks include a connection task that permits a connection to the specific wireless AP based on the connection request in a case no external apparatus is currently connected to the specific wireless AP when the connection request is received.

4. The apparatus according to claim 3, wherein:
the connection task establishes a connection between the specific wireless AP and the external apparatus, which is a transmission source of the connection request, in a case where the connection to the wireless AP based on the connection request has been permitted, and
the setting task, in a case where the connection has been established, sets the image processing apparatus in accordance with a setting request received from the external apparatus via the specific wireless AP.

5. The apparatus according to claim 4, wherein:
the setting request includes a designation of a wireless AP to be connected by the second mode, and
the connecting task controls the wireless interface to connect to the wireless AP designated by the setting request by the second mode.

6. The apparatus according to claim 5, wherein the connecting task controls, in a case where the image processing apparatus has been connected to an external wireless AP by the second mode, the wireless interface to change the connection destination wireless AP to the wireless AP designated by the setting request.

7. The apparatus according to claim 1, wherein the limiting task rejects a connection to the specific wireless AP based on the connection request, in a case where another external apparatus is currently connected to the specific wireless AP when the connection request is received.

8. The apparatus according to claim 1, wherein the limiting task, after a connection between the specific wireless AP and the external apparatus, which is a transmission source of the connection request has been established, limits the number of external apparatuses that use the setting service to one.

9. The apparatus according to claim 8, wherein:
the plurality of tasks include a connection task that establishes, in the case where the connection request has been received, a connection between the specific wireless AP and the external apparatus, which is a transmission source of the connection request, and the setting task rejects the use of the setting service by the external apparatus connecting to the specific wireless AP in a case where another external apparatus is currently using the setting service.

10. The apparatus according to claim 8, wherein the setting task permits the use of the setting service by the external apparatus connected to the specific wireless AP in a case where no other external apparatus is currently using the setting service.

11. The apparatus according to claim 1, wherein the plurality of task include an authenticating task that:
 authenticates a user who operates the image processing apparatus;
 activates the specific wireless AP in accordance with an instruction from the authenticated user; and
 receives authentication information of a user of the external apparatus from the external apparatus, which is a transmission source of the connection request; and
 rejects the connection to the wireless AP based on the connection request in a case where the authenticated user and the user of the external apparatus corresponding to the received authentication information do not match.

12. The apparatus according to claim 11, wherein the authenticating task permits the connection to the specific wireless AP based on the connection request in a case where the authenticated user and the user of the external apparatus match.

13. The apparatus according to claim 1, further comprising:
 a display unit that displays, after a connection between the specific wireless AP and the external apparatus, which is a transmission source of the connection request has been established, a password to use the setting service,
 wherein the plurality of tasks include an authenticating task that:
  receives a password from the external apparatus, which is the transmission source of the connection request; and
  rejects the use of the setting service by the external apparatus connecting to the specific wireless AP in a case where the received password and the password displayed by the display unit do not match.

14. The apparatus according to claim 13, wherein the authenticating task permits the use of the setting service by the external apparatus connected to the specific AP in a case where the received password and the displayed password match.

15. The apparatus according to claim 13, wherein the authenticating task sets a unique password for each user.

16. The apparatus according to claim 1, wherein the limiting task:
 simultaneously activates a plurality of wireless APs that include the specific wireless AP and a wireless AP used for inputting a job to the image processing apparatus; and
 limits, for only the specific wireless AP, the number of external apparatuses that use the setting service.

17. The apparatus according to claim 1, wherein the setting task further:
 confirms whether a connection to the external wireless AP is possible based on the information of the external wireless AP to which the wireless client is to connect; and
 in a case whether confirmation is made, sets the information to the image processing apparatus.

18. A control method for an image processing apparatus that includes a wireless interface configured to operate in a first mode that causes the image processing apparatus to operate as a wireless access point (AP) and in a second mode that causes the image processing apparatus to operate as a wireless client that connects to an external wireless AP, the method comprising the steps of:
 activating a specific wireless AP by the first mode for using a setting service that allows an external apparatus to perform setting to cause the image processing apparatus to connect to a network by the second mode;
 receiving, from an external apparatus via the wireless interface, a connection request to the specific wireless AP activated in the activating;
 limiting, in a case where the connection request has been received in the receiving step, a number of external apparatuses that connect to the specific wireless AP to use the setting service;
 receiving information for connecting to the external wireless AP from the external apparatus via the activated specific wireless AP; and
 setting, to the image processing apparatus, for using the setting service, information of the external wireless AP to which the wireless client is to connect, based on the received information.

19. A non-transitory computer-readable storage medium storing a computer program executable by a computer to execute a control method for an image processing apparatus that includes a wireless interface configured to operate in a first mode that causes the image processing apparatus to operate as a wireless access point (AP) and in a second mode that causes the image processing apparatus to operate as a wireless client that connects to an external wireless AP, the method comprising the steps of:
 activating a specific wireless AP by the first mode for using a setting service that allows an external apparatus to perform setting to cause the image processing apparatus to connect to a network by the second mode;
 receiving, from an external apparatus via the wireless interface, a connection request to the specific wireless AP activated in the activating; and
 limiting, in a case where the connection request has been received in the receiving step, a number of external apparatuses that connect to the specific wireless AP to use the setting service;
 receiving information for connecting to the external wireless AP from the external apparatus via the activated specific wireless AP; and
 setting, to the image processing apparatus, for using the setting service, information of the external wireless AP to which the wireless client is to connect, based on the received information.

* * * * *